Patented July 19, 1949

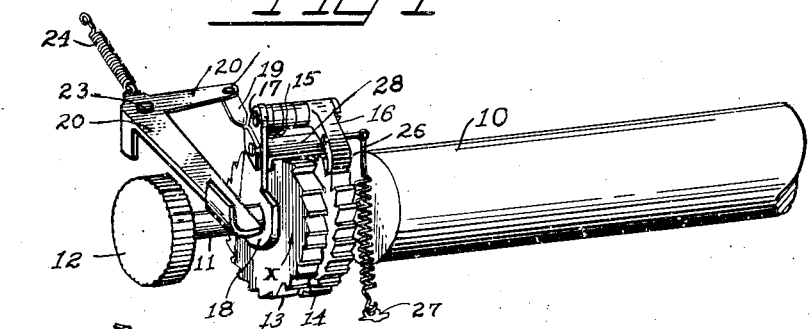
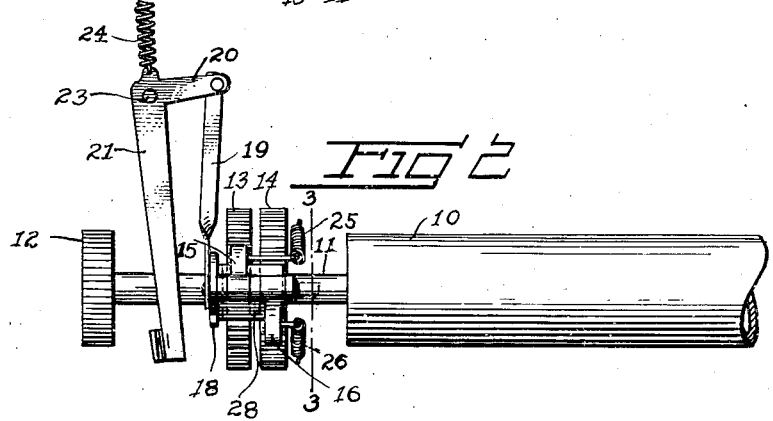
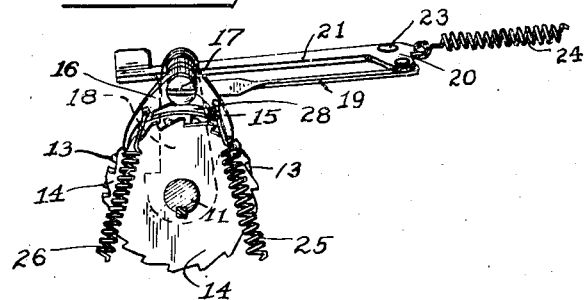

2,476,917

UNITED STATES PATENT OFFICE 2,476,917

FORWARD AND REVERSE LINE SPACING DEVICE FOR TYPEWRITERS

Manley Ruben, Los Angeles, Calif.

Application August 1, 1946, Serial No. 687,568

3 Claims. (Cl. 197—114)

1

This invention relates to a double action lever for advancing as well as reversing the line spacing on a typewriter machine. Usually this is accomplished by turning the roller by hand in either direction, using the knurled finger knob at the end of the roller, or else for advancing line spacing only, by the use of a shifting lever at the left of the machine.

The improvement now resides in the fact, that it will be possible to accomplish both the advance line-spacing and the reverse spacing by the same spacing lever, which is therefore made double acting, that is, by swinging the lever right from normal for advancing and swinging it left for reversing the line spacing. This is accomplished by providing two oppositely working ratchet wheels and dogs for the roller shaft.

In the accompanying drawing these new features are illustrated.

Figure 1 is a fragmentary, perspective view of the left end of a typewriter roller with the new device in position;

Figure 2 is a top plan view of Figure 1; and

Figure 3 is an end view of the device in partial perspective, on line 3—3 of Figure 2.

Like numerals are used in the different views for the same details.

The roller 10 for carrying the paper is of the usual construction and is carried in the frame on a shaft 11 for revolving in opposite directions when turned by the knurled head or knob 12 at the end of the shaft.

On this shaft 11 are keyed two ratchet wheels 13, 14 with teeth pointer in opposite directions, so that wheel 13 actuated by a dog 15 turns the shaft and the roller 10 counterclockwise, arrow X, as seen from the end of head 12, that is to say, setting the roller 10 and the paper thereon for advance spacing; while the ratchet wheel 14, actuated by its dog 16, turns the roller 10 clockwise for reverse spacing.

The ratchet arms or dogs 15, 16 are both pivoted on a stud 17 secured on a rocking member 18 which is carried loosely on the shaft 11. This member has a link connection 19 with the short finger 20 of the spacer lever 21 which is pivoted at 23 on the frame to swing right or left from its inactive or central position as held by a spring 24 in the usual manner.

The advancing ratchet dog 15 is pressed against the teeth of ratchet wheel 13 by a tension spring 25 and the reversing dog 16 similarly pressed against the teeth of wheel 14 by another spring 26. Both of these springs 25, 26 operate from fixed points 27 on the frame.

2

Over the ratchet teeth of wheels 13, 14 is provided a tripper guide 28 of usual construction, see Figure 3.

In operation this device functions similarly to the usual line shifts.

By pushing the spacer lever 21, one, two or three times to the right, the roller 10 with the paper thereon will turn to advance the line spacing correspondingly through the arm, link and rocker 20, 19 and 18, respectively, and the dog 15 and the ratchet wheel 13.

By pushing the same spacer lever 21, one or more times to the left, a corresponding number of reverse line spacings will take place through the intermediary of elements 20, 19, 18, 16 and 14.

Formerly, only one of these settings could be accomplished by the spacing lever. Now, however, the lever 21 being double acting, both forward line spacing and back line spacing can be executed by this member.

It is to be understood that the invention as herein disclosed may be varied from the details described and shown without departure from the spirit of the subjoined claims.

I claim:

1. A double acting line spacing device for typewriting machines provided with a frame and a roller carrying shaft mounted to revolve on the frame; a member mounted on the shaft for rocking movement only about the axis of the shaft, a pivot stud carried by the member in spaced parallel relation with the shaft, a pair of ratchet wheels carried by and secured to the shaft, the teeth of said wheels being oppositely directed, said pivot stud being disposed across and spaced from the toothed peripheries of the wheels, oppositely directed pawls rockably supported on the stud for operative connection each with a wheel, a lever pivoted on the frame having a neutral working position, and means coupling the lever with said member for effecting rocking of the member and pawls in either of two directions upon swinging the lever in either of two directions from said neutral position.

2. A double acting line spacing device for typewriting machines, as set forth in claim 1, wherein said lever is pivoted for rocking movement on an axis perpendicular to the shaft and extends across the shaft toward the front of the machine, the said coupling means between the lever and said member comprising a laterally extending finger integral with the lever at the pivoted end thereof, and a link pivotally coupling the finger with said member.

3. A double acting line spacing device for typewriting machines as set forth in claim 1, with a tripper guide disposed across the peripheries of the wheels between the latter and the pivot stud onto which one pawl rides when the other pawl is operatively engaged with and actuating a wheel.

MANLEY RUBEN.

REFERENCES CITED

The following references are of record in the file of this patent:

UNITED STATES PATENTS

| Number | Name | Date |
|---|---|---|
| 345,347 | Whaley | July 13, 1886 |
| 712,538 | Howell, Jr. | Nov. 4, 1902 |
| 1,092,779 | Lux | Apr. 7, 1914 |
| 1,159,912 | Etheridge | Nov. 9, 1915 |
| 1,241,026 | Sampson | Sept. 25, 1917 |